United States Patent
Steidl et al.

(10) Patent No.: US 11,371,581 B2
(45) Date of Patent: Jun. 28, 2022

(54) TORSIONAL VIBRATION DAMPER OR TORSIONAL TUNED MASS DAMPER

(71) Applicant: Hasse & Wrede GmbH, Berlin (DE)

(72) Inventors: Michael Steidl, Berlin (DE); Florian Knopf, Berlin (DE)

(73) Assignee: Hasse & Wrede GmbH, Berlin (DE)

( * ) Notice: Subject to any disclaimer, the term of this patent is extended or adjusted under 35 U.S.C. 154(b) by 3 days.

(21) Appl. No.: 16/761,414

(22) PCT Filed: Oct. 18, 2018

(86) PCT No.: PCT/EP2018/078530
§ 371 (c)(1),
(2) Date: May 4, 2020

(87) PCT Pub. No.: WO2019/086258
PCT Pub. Date: May 9, 2019

(65) Prior Publication Data
US 2021/0003193 A1   Jan. 7, 2021

(30) Foreign Application Priority Data

Nov. 3, 2017 (DE) ..................... 10 2017 125 690.3

(51) Int. Cl.
*F16F 15/16* (2006.01)
*F16F 15/167* (2006.01)

(52) U.S. Cl.
CPC .......... *F16F 15/161* (2013.01); *F16F 15/162* (2013.01); *F16F 15/167* (2013.01)

(58) Field of Classification Search
CPC .... F16H 57/03; F16H 57/037; F16H 57/0416; F16H 57/0415; B60K 1/00; B60K 17/16; B60K 2001/001
See application file for complete search history.

(56) References Cited

U.S. PATENT DOCUMENTS

| 5,226,514 A | * | 7/1993 | Chimner | ............... F16F 15/161 192/207 |
| 5,240,459 A | * | 8/1993 | Herbert | .................. A63C 19/00 472/86 |
| 2010/0043593 A1 | | 2/2010 | Carlson et al. | |

FOREIGN PATENT DOCUMENTS

| CN | 107110286 A | 8/2017 |
| CN | 107208734 A | 9/2017 |
| DE | 10 2005 031 813 A1 | 1/2007 |

(Continued)

OTHER PUBLICATIONS

EPO Translation of the Description of DE 102005031813 A1, Spahn, Jan. 18, 2007 (Year: 2021).*

(Continued)

*Primary Examiner* — Daniel D Yabut
(74) *Attorney, Agent, or Firm* — Crowell & Moring LLP

(57) ABSTRACT

A torsional vibration damper or torsional tuned mass damper having a rotating system having a primary mass, which is arranged, or preferably fixable for conjoint rotation on a rotatable shaft, such as a crankshaft of a motor, for example, in particular an internal combustion engine, and having a secondary mass, which is movable relative to the primary mass. An assembly for vibration dampening and/or tuned vibration dampening of the relative motion between the primary mass and the secondary mass is formed in part outside of the rotating system of the torsional vibration damper or torsional tuned mass damper.

7 Claims, 2 Drawing Sheets

(56) References Cited

FOREIGN PATENT DOCUMENTS

| | | | | |
|---|---|---|---|---|
| DE | 10 2006 059 880 A1 | 6/2008 | | |
| DE | 102007034053 A1 * | 1/2009 | ............... | F16D 3/80 |
| DE | 10 2008 001 495 A1 | 11/2009 | | |
| DE | D E-102012211526 A1 * | 1/2014 | ............ | F16F 15/161 |
| DE | 10 2014 206 230 A1 | 10/2015 | | |
| FR | 1375156 A * | 10/1964 | ............ | F16F 15/161 |
| GB | 842304 A | 7/1960 | | |
| JP | 2009-115104 A | 5/2009 | | |
| WO | WO 95/23300 A1 | 8/1995 | | |
| WO | WO 2007/092708 A1 | 8/2007 | | |
| WO | WO-2017125221 A1 * | 7/2017 | ............ | F16F 15/161 |
| WO | WO-2017132644 A1 * | 8/2017 | .............. | F16D 1/116 |

OTHER PUBLICATIONS

EPO Translation of the Description WO 2017/125221 A1, Orlamünder et al., Jul. 2017. (Year: 2021).*

International Preliminary Report on Patentability (PCT/IB/326 & PCT/IB/373) issued in PCT Application No. PCT/EP2018/078530 dated May 14, 2020, including English translation of document C2 (German-language Written Opinion (PCT/ISA/237) previously filed on May 4, 2020) (nine pages).

Chinese-language Office Action issued in Chinese Application No. 201880071153.1 dated Mar. 24, 2021 with partial English translation (eight (8) pages).

Cover Page of EP 0 746 702 A1 published Dec. 11, 1996 (one (1) page).

International Search Report (PCT/ISA/210) issued in PCT Application No. PCT/EP2018/078530 dated Feb. 22, 2019 with English translation (five pages).

German-language Written Opinion (PCT/ISA/237) issued in PCT Application No. PCT/EP2018/078530 dated Feb. 22, 2019 (six pages).

German-language Office Action issued in German Application No. 10 2017 125 690.3 dated Jun. 21, 2018 (seven pages).

Korean-language Office Action issued in Korean Application No. 10-2020-7015953 dated Jul. 20, 2021 with English translation (11 pages).

* cited by examiner

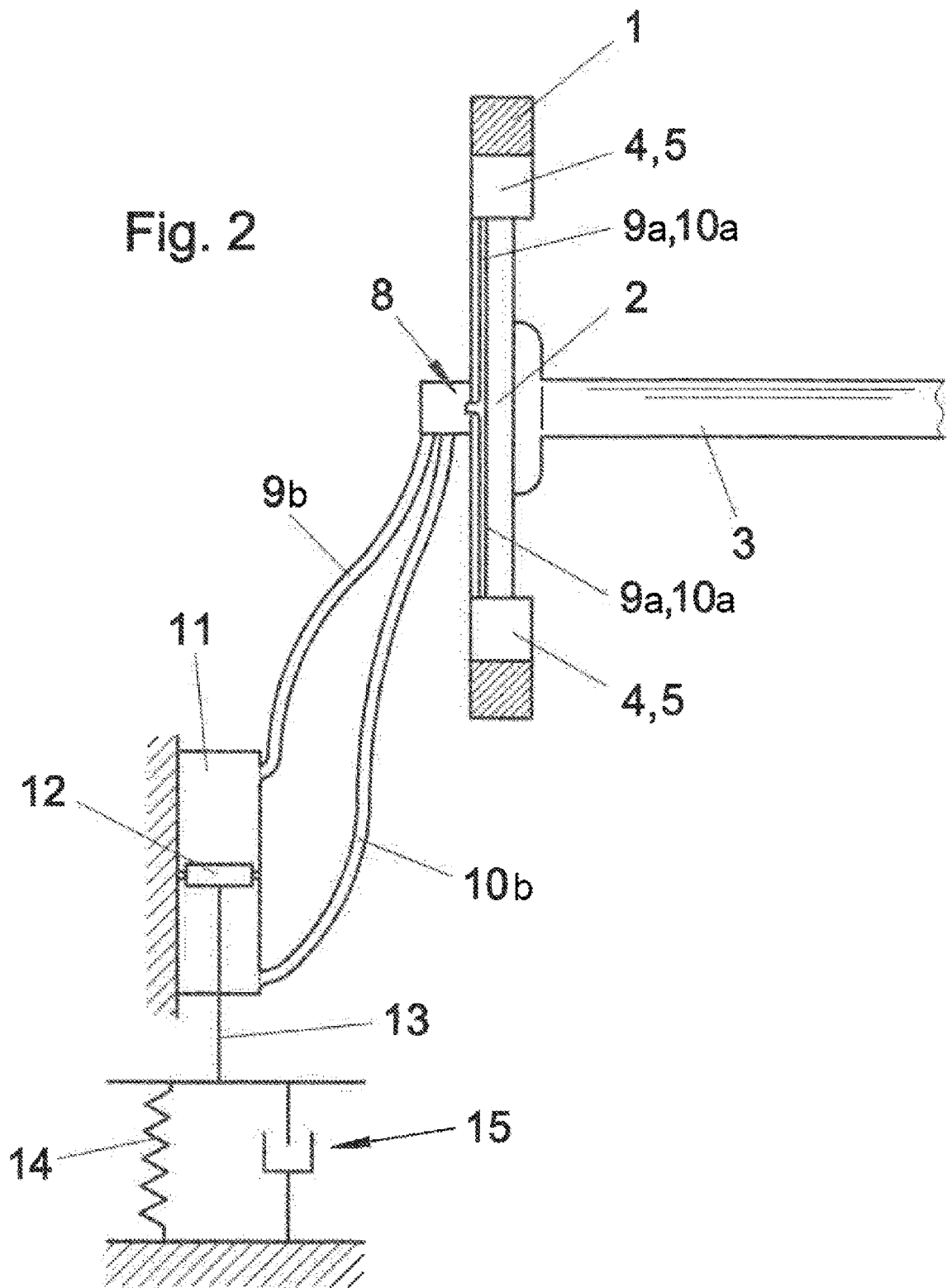

TORSIONAL VIBRATION DAMPER OR TORSIONAL TUNED MASS DAMPER

BACKGROUND AND SUMMARY OF THE INVENTION

The present invention relates to a torsional vibration damper or torsional vibration attenuator.

Passive torsional vibration dampers or torsional vibration attenuators are formed from different structural elements/components. In this instance, two or three of the following principles/components are used.

(1) "Kinetic energy store" component:

Passive torsional vibration dampers or torsional vibration attenuators always have in their basic structure a store for kinetic energy which is formed by means of a seismic mass. This may advantageously be constructed as a vibration damping ring and is also referred to as a secondary mass.

(2) "Potential energy store" component:

A store of potential energy may be formed by a torsional resilient stiffness between the secondary mass (in particular the vibration damping ring) and a housing portion and/or hub portion which is also referred to as a primary mass.

(3) Dissipative component:

It is possible to provide as a dissipative component—depending on the construction type—between a primary mass (housing portion and/or hub portion) and the secondary mass—that is to say, for example, between the hub portion/housing and the vibration damping ring—a damping element or component which, for example, acts by means of solid state friction, viscosity damping or hydraulic damping.

The seismic mass is always present in torsional vibration dampers or torsional vibration attenuators. In a torsional vibration damper, there is additionally provided a dissipative component and in the attenuator the "potential energy store". In a damped torsional vibration attenuator, all three components are used. The damped torsional vibration attenuator is referred to below using the term "torsional vibration attenuator".

In the passive torsional vibration dampers or torsional vibration attenuators currently constructed in practice, all the components are in a sub-assembly, which is connected so as to rotate with the shaft. This sub-assembly consequently forms a rotating system.

Although this has the advantage that only a single sub-assembly is intended to be secured to the shaft which is intended to be damped/attenuated, it also has some disadvantages in practice.

With regard to the often limited structural space for a torsional vibration damper/torsional vibration attenuator of the construction type mentioned above, it is thus not always possible to produce the required rigidity and damping. Heat which is produced as a result of the damping can also often only be discharged with difficulty. This problem therefore limits the function and service-life of the torsional vibration damper or torsional vibration attenuator.

A change of the adjustment of the torsional vibration damper/torsional vibration attenuator in the installed state is only possible in a very difficult manner or even impossible.

A maintenance of the components of the torsional vibration damper or torsional vibration attenuator in the installed state is also possible only in a difficult manner or completely impossible.

An object of the present invention is to provide a torsional vibration damper or torsional vibration attenuator of the generic type which does not have the present disadvantages.

This object is achieved by the subject-matter of the independent claim. Advantageous embodiments of the invention can be derived from the dependent claims.

According to the invention, there is formed a torsional vibration damper or torsional vibration attenuator which is provided with a rotating system having a primary mass which is arranged, preferably can be fixed in a rotationally secure manner, on a rotatable shaft, for example, a crankshaft of a motor, in particular an internal combustion engine, and having a secondary mass which can be moved relative to the primary mass, and having a sub-assembly for vibration damping and/or vibration attenuation of the relative movement between the primary mass and the secondary mass, wherein the sub-assembly is constructed completely or partially outside the rotating system of the torsional vibration damper or torsional vibration attenuator.

As a result of the displacement of a portion of the sub-assembly outside the rotating system, it is possible to produce there in a simple manner a vibration-attenuating and/or vibration-damping effect and to feed it back into the rotating system. It is also conceivable to produce only a portion of the vibration-attenuating or vibration-damping action outside the rotating system and to produce a portion of the vibration-attenuating or vibration-damping action inside the rotating system.

According to an advantageous embodiment, there may be provision for the sub-assembly for vibration damping and/or vibration attenuation of the relative movement between the primary mass and the secondary mass to have one or more fluid-filled chamber(s) as part of the rotating system, the volume of which can be changed in the event of rotational vibrations and resultant relative movements between the primary mass and secondary mass, wherein this volume change is transmitted via a rotary transmission for the fluid from the rotating system via one or more lines into a region which does not also rotate outside the rotating system.

This construction variant is structurally well implemented and enables in a simple manner a vibration damping and/or absorption outside the rotating system particularly when the lines are connected to one or more damping or resilient elements outside the rotating system so that an occurrence of a vibration-damping or vibration-attenuating action is fed back via the one or more lines into the rotating system.

In this instance, there may advantageously be provision for the one or more vibration-damping and/or vibration-attenuating elements to comprise outside the system which rotates during operation at least one hydraulic actuator (hydraulic cylinder) and/or at least one potential energy store and/or at least one damping device.

The hydraulic cylinder may be constructed in different manners. It is conceivable to use a piston which can be actuated at two sides. However, the term is not limited thereto in this case. The one or more hydraulic cylinders may also be constructed differently. The hydraulic cylinders may, for example, advantageously have at one side of an axially displaceable piston a fluid chamber which can be changed in terms of size by displacing the piston and which has a fluid connection and at the other side of the piston a space which is filled with a gas, in particular air, and which consequently forms a type of gas spring, in particular a pneumatic spring. In this instance, it is advantageous to use two of the above-described hydraulic cylinders with gas springs. For example, the two supply lines from FIG. 2 (see the description therein) instead of being connected to the piston which is acted on at both sides are connected in each case to one of the hydraulic connections of the two hydraulic cylinders with a gas spring, that is to say, in a manner of speaking provided on a pneumatic spring (without piston) in each case. There may be provision for the one or more vibration-damping and/or vibration-attenuating elements to comprise outside the rotating system not only passively operating structural elements but also at least one actively operating device, such as a controllable pump.

Using the device proposed according to claim 1 and developed according to the dependent claims, the relative movements which occur in the event of rotational vibrations between the damping ring and hub portion are preferably fluidically transmitted—that is to say, hydraulically or pneumatically—into a non-rotating region outside the rotating system, in which measures required for the vibration damping and/or vibration attenuation can be carried out without the limitations mentioned in the introduction.

It is thus possible for all or a portion of the measures required for the vibration damping and/or the vibration attenuation of a shaft to be implemented outside the rotating system. This is a significant advantage since subsequent changes can also be carried out. Other advantages are:

Structural space limitations on the shaft can be released by the displacement of the spring and damper.

The adaptation of the spring and damper can be subsequently adapted to the vibration behavior of the actual system.

As a result of active elements, for example, hydraulic pumps, the vibration behavior of the system can be further improved.

The implementation of a semi-active system, for example, by means of a speed-dependent switching-on or switching-off of the spring or damper elements is possible in a simple manner.

It is possible to use pneumatic springs, the rigidity of which can be simply changed by pumping up.

Cost-effective, standardized structural elements, such as helical pressure springs, shock-absorbers and hydraulic bushings can be used.

An embodiment of the invention is illustrated in the appended drawings and is described in greater detail below. This embodiment serves only to illustrate the invention with reference to a preferred construction which does not, however, illustrate the invention definitively. In the context of the claims, other embodiments and modifications and equivalents of the embodiment illustrated can be carried out in this regard.

BRIEF DESCRIPTION OF THE DRAWINGS

FIG. 2 is a schematically illustrated radial section through the torsional vibration damper or torsional vibration attenuator according to the invention from FIG. 1 and a schematically illustrated hydraulic cylinder, a spring and a damper.

DETAILED DESCRIPTION OF THE DRAWINGS

Figure 1:
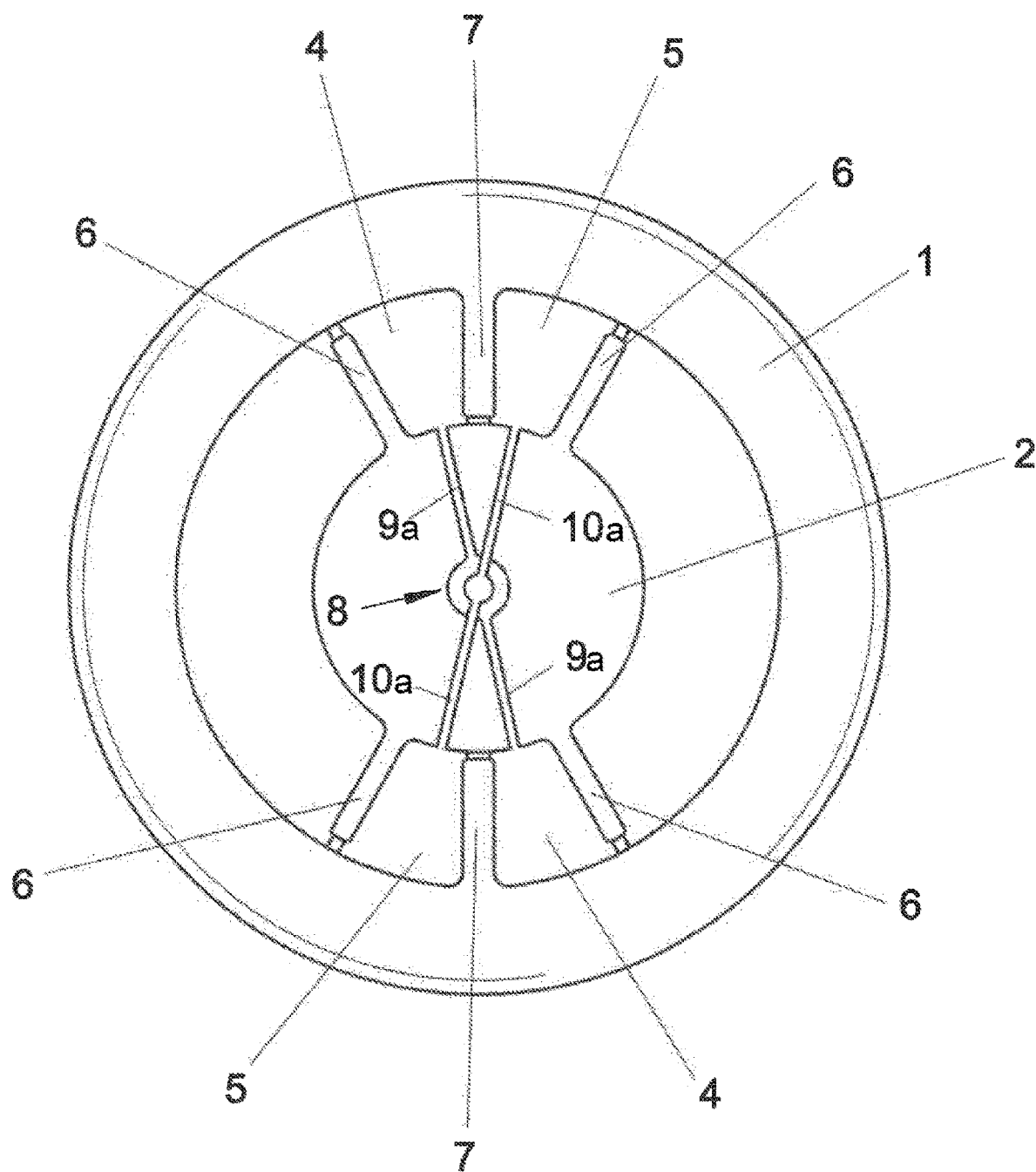
FIG. 1 is a schematically illustrated cross-section transverse relative to the rotation axis of a torsional vibration damper or torsional vibration attenuator according to the invention.

In FIG. 1, a secondary mass—in this instance a damping ring—is designated 1 and a primary mass—in this instance, a hub portion—of a torsional vibration damper or torsional vibration attenuator—in particular also of a damped torsional vibration attenuator—is designated 2, wherein below for reasons of simplification only a torsional vibration damper is referred to. The hub portion 2 serves in a manner known per se to secure to a shaft 3, for example, of an internal combustion engine, as indicated in FIG. 2 as a result. The primary mass 2 and secondary mass 1 form a system which rotates during operation.

Between the secondary mass—in this instance, the damping ring 1—and the primary mass—in this instance, the hub portion 2—as shown very clearly in FIG. 1, a plurality of chambers 4, 5 which are filled with fluid or air are provided, wherein these chambers 4, 5 are each delimited by radially extending webs 6 of the hub portion 2 or 7 of the damping ring 1. The chambers 4, 5 form a portion of the rotating system. They additionally form a portion of a sub-assembly for vibration damping and/or vibration attenuation of the relative movement between the damping ring 1 and the hub portion 2, wherein this sub-assembly is partially formed outside the rotating system of the torsional vibration damper. This means that it has one or more components therein.

The mentioned chambers 4, 5 are connected to a hydraulic or pneumatic rotary transmission 8 by radial holes 9a and 10a, respectively.

As a result of the rotary transmission 8 mentioned, the radial holes 9a and 10a are connected to lines 9b and 10b which lead outward and which are located in a non-rotating region. These lines 9b, 10b open in the illustrated embodiment according to FIG. 2 in a housing 11, inside which a piston 12 is movably arranged.

In this manner, another portion of the sub-assembly for vibration damping and/or vibration attenuation of the relative movement is formed between the damping ring 1 and hub portion 2, wherein this portion of the sub-assembly is constructed completely or partially outside the rotating system of the torsional vibration damper or torsional vibration attenuator.

The piston rod 13 of the piston 12 is in this instance loaded by a potential energy store, in particular a spring, in a particularly preferred manner a helical spring 14. A mechanical damping element 15 is arranged parallel with this spring.

Consequently, the components required for a vibration damping (and/or absorption) are placed in the non-rotating outer region of the shaft 3 which is intended to be influenced so that all the required measures can be carried out in this region and, which is a significant advantage, can also be changed.

It is thus possible, for example, by changing the adjustment of the helical spring 14, to change the absorber frequency as desired. Similarly, in place of a helical spring as a force store, a pneumatic spring can also be used and may have a changeable rigidity as a result of a lesser or greater extent of pumping up.

An adjustment of the helical spring 14 and damping element 15 can subsequently be adapted at any time to the vibration behavior of the present system.

In addition, active elements (which are not illustrated in the drawings), such as, for example, hydraulic pumps, can further improve the vibration behavior of the system.

It is also possible to produce a semi-active system, for example, by means of a speed-dependent switching-on or off of spring or damper elements in a simple manner.

On the whole, only cost-effective, standardized structural elements, such as helical pressure springs, shock-absorbers and hydraulic or pneumatic transmissions are required for the entire sub-assembly.

As can be seen in particular in FIG. 1, there are provided in each case two mutually diametrically opposed chambers 4, 5 which are subdivided in the manner set out by means of the radially extending webs 6 of the hub portion 2 and 7 of the damping ring 1.

LIST OF REFERENCE NUMERALS

1 Damping ring
2 Hub portion
3 Shaft
4 Chamber
5 Chamber
6 Web
7 Hub portion
8 Rotary transmission
9 Radial hole/Line
10 Radial hole/Line
11 Housing
12 Piston
13 Piston rod
14 Helical spring
15 Damping element

What is claimed is:

1. A torsional vibration damper or torsional vibration attenuator, comprising:
   a rotating system having a primary mass which is arranged on a rotatable shaft of a motor;
   a secondary mass which is movable relative to the primary mass, and
   a sub-assembly for vibration damping and/or vibration attenuation of a relative movement between the primary mass and the secondary mass,
   wherein
      the sub-assembly for vibration damping and/or vibration attenuation of the relative movement between the primary mass and the secondary mass is constructed partially outside the rotating system of the torsional vibration damper or torsional vibration attenuator at a location which does not rotate with the rotating system,
      the sub-assembly includes, as part of the rotating system, one or more fluid-filled chambers having a volume which is changeable in response to the relative movement between the primary mass and secondary mass,
      a change in the volume of the one or more fluid-filled chambers results in movement of a fluid between the fluid-filled chambers of the rotating system and two or more lines of the sub-assembly outside the rotating system which do not rotate with the rotating system,
      the sub-assembly includes one or more vibration-damping and/or vibration-attenuating elements outside the rotating system which do not rotate with the rotating system,
      the one or more vibration-damping and/or vibration-attenuating elements outside the rotating system which do not rotate with the rotating system include at least one hydraulic cylinder having mutually diametrically opposed chambers, and
      each of the two or more lines is connected to a respective hydraulic connection of respective ones of the mutually diametrically opposed chambers of the at least one hydraulic cylinder such that the fluid movement in the two or more lines causes a piston in the at least one hydraulic cylinder to move such that fluid movement from one of the one or more fluid-filled chambers of the rotating system into one of the mutually diametrically opposed chambers displaces fluid in the other of the mutually diametrically opposed chambers into another one of the one or more fluid-filled chambers of the rotating system.

2. The torsional vibration damper or torsional vibration attenuator as claimed in claim 1, wherein
   the one or more vibration-damping and/or vibration-attenuating elements outside the rotating system and the at least one hydraulic cylinder feed back a vibration-damping or vibration-attenuating action via the one or more lines into the rotating system.

3. The torsional vibration damper or torsional vibration attenuator as claimed in claim 2, wherein
   the one or more vibration-damping and/or vibration-attenuating elements comprise, outside the rotating system, at least one potential energy store connected to the piston of the at least one hydraulic cylinder.

4. The torsional vibration damper or torsional vibration attenuator as claimed in claim 2, wherein
   the one or more vibration-damping elements comprise outside the rotating system at least one damping device connected to the piston of the at least one hydraulic cylinder.

5. The torsional vibration damper or torsional vibration attenuator as claimed in claim 2, wherein
   the one or more vibration-damping or vibration-attenuating elements comprise, outside the rotating system, at least one actively operating device connected to the piston of the at least one hydraulic cylinder.

6. The torsional vibration damper or torsional vibration attenuator as claimed in claim 5, wherein
   the at least one actively operating device is a controllable pump.

7. The torsional vibration damper or torsional vibration attenuator as claimed in claim 1, wherein the one or more chambers are sub-divided in each case by radially extending webs of a hub portion and radially extending webs of a damping ring.

* * * * *